US010009825B1

(12) United States Patent
Marupaduga et al.

(10) Patent No.: US 10,009,825 B1
(45) Date of Patent: Jun. 26, 2018

(54) DONOR SELECTION FOR RELAY ACCESS NODES

(71) Applicant: Sprint Spectrum LP, Overland Park, KS (US)

(72) Inventors: Sreekar Marupaduga, Overland Park, KS (US); Andy Wurtenberger, Olathe, KS (US); John Prock, Raymore, MO (US); Nitesh Manchanda, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 115 days.

(21) Appl. No.: 15/001,747

(22) Filed: Jan. 20, 2016

(51) Int. Cl.
| | | |
|---|---|---|
| *H04W 40/22* | (2009.01) | |
| *H04W 28/12* | (2009.01) | |
| *H04W 72/04* | (2009.01) | |
| *H04W 28/02* | (2009.01) | |
| *H04W 76/00* | (2018.01) | |
| *H04B 7/155* | (2006.01) | |
| *H04W 76/40* | (2018.01) | |
| *H04W 88/04* | (2009.01) | |
| *H04W 88/08* | (2009.01) | |

(52) U.S. Cl.
CPC ........ *H04W 40/22* (2013.01); *H04B 7/15507* (2013.01); *H04W 28/0268* (2013.01); *H04W 28/12* (2013.01); *H04W 72/042* (2013.01); *H04W 72/0413* (2013.01); *H04W 72/0446* (2013.01); *H04W 76/002* (2013.01); *H04W 76/40* (2018.02); *H04W 88/04* (2013.01); *H04W 88/08* (2013.01)

(58) Field of Classification Search
CPC . H04W 40/22; H04W 28/0268; H04W 28/24; H04W 28/12; H04W 72/0413; H04W 72/042; H04W 72/0446; H04W 76/002; H04W 88/04; H04W 88/08; H04B 7/15507
USPC ................................... 370/241, 252
See application file for complete search history.

(56) References Cited

U.S. PATENT DOCUMENTS

| | | | | |
|---|---|---|---|---|
| 2010/0214964 | A1* | 8/2010 | Larsson | H01Q 3/2605 370/277 |
| 2012/0009966 | A1* | 1/2012 | Khanka | H04W 72/06 455/509 |
| 2012/0176958 | A1 | 7/2012 | Queseth et al. | |
| 2012/0315913 | A1* | 12/2012 | Yang | H04W 48/16 455/438 |

(Continued)

FOREIGN PATENT DOCUMENTS

GB    2526964 A  * 12/2015  ........... G06F 9/5088

*Primary Examiner* — Obaidul Huq

(57) ABSTRACT

A relay wireless device is configured to function as a relay on behalf of a donor access node. The relay wireless device determines a preferred donor access node from among a plurality of candidate donor access nodes based on a comparison with a number of thresholds for reliable and efficient provision of services to end-user wireless devices via the relay wireless device. Any access node that meets the threshold requirements is added to a list of candidate donor access nodes. The candidate donor access node that best meets the thresholds may be selected as the preferred donor access node, and a connection request submitted to the preferred donor access node.

20 Claims, 6 Drawing Sheets

(56) References Cited

U.S. PATENT DOCUMENTS

| | | | |
|---|---|---|---|
| 2013/0279346 A1* | 10/2013 | Zhang | H04W 24/08 370/241.1 |
| 2014/0196025 A1* | 7/2014 | Corinella | H04W 4/001 717/178 |
| 2014/0301371 A1* | 10/2014 | Maeda | H04W 36/0011 370/331 |

* cited by examiner

DONOR SELECTION FOR RELAY ACCESS NODES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or donor access node, and an end-user wireless device. Relay wireless devices may be used at the edge of a coverage area of a donor access node to improve coverage and/or service, as well as in crowded areas having a high number of other wireless devices to increase the available throughput to the end-user wireless devices being relayed. However, relay wireless devices may be limited in their ability to effectively service end-user wireless devices that are attached to it, particularly if the resources are limited from the donor access node providing the service, or if the relay wireless device is unable to determine a preferred donor access node from among a plurality of nearby access nodes.

OVERVIEW

Exemplary embodiments described herein include systems, methods, and nodes for donor selection for a relay access node. A method for donor selection in a relay access node includes identifying a plurality of candidate donor access nodes. The relay access node is within a radio range of each of the plurality of candidate donor access nodes. The method further includes obtaining a plurality of characteristics associated with each of the plurality of candidate donor access node. The plurality of characteristics comprises one or more of a reliability characteristic, a resource characteristic, or a radio characteristic. Based on a comparison of the plurality of characteristics between each of the plurality of candidate donor access nodes, the method includes determining a preferred donor access node, and requesting a connection to the preferred donor access node.

A system for donor selection includes a relay access node configured to relay wireless services from a donor access node to one or more wireless devices, and a processor communicatively coupled to the relay access node. The processor configures the relay access node to execute operations including determining one or more candidate donor access nodes out of a plurality of donor access nodes, the one or more candidate donor access nodes meeting one or more threshold criteria, and requesting a connection to a preferred donor access node out of the one or more candidate donor access nodes that most exceeds the one or more threshold criteria. The one or more threshold criteria comprise one or more of a reliability criteria, a resource criteria, or a radio criteria.

A relay node for donor selection includes a processor for enabling the relay node to perform operations comprising obtaining a plurality of characteristics associated with each of a plurality of candidate donor access node. The relay access node is within a radio range of each of the plurality of candidate donor access nodes. The plurality of characteristics comprises one or more of a reliability characteristic, a resource characteristic, or a radio characteristic. Based on a comparison of each the plurality of characteristics with a corresponding plurality of threshold criteria, the relay node determines a preferred donor access node. The plurality of threshold criteria comprises one or more of a reliability criteria, a resource criteria, or a radio criteria. The relay node further requests a connection to the preferred donor access node

DETAILED DESCRIPTION

Figure 1:
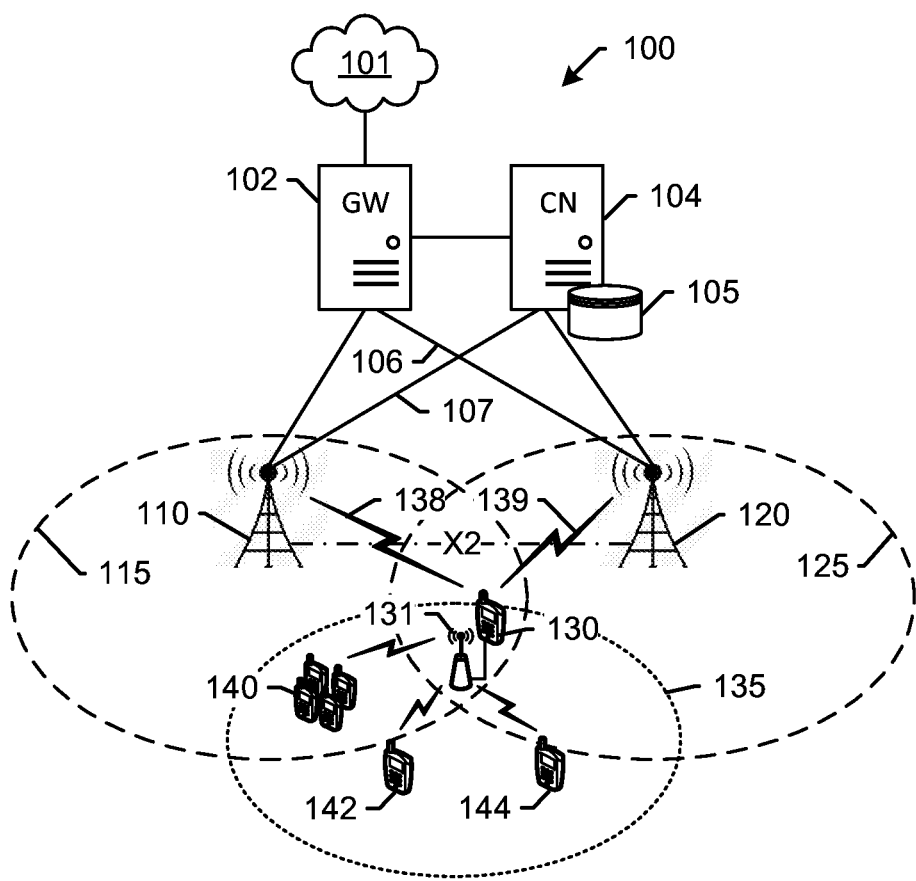
FIG. 1 depicts an exemplary system for donor selection.

In embodiments disclosed herein, a relay wireless device is enabled to determine a preferred donor access node from among a plurality of candidate donor access nodes that are within range of the relay wireless device. The preferred donor access node is able to satisfy a number of thresholds for reliable and efficient provision of services to end-user wireless devices via the relay wireless device. The relay wireless device measures or otherwise obtains characteristics of a plurality of access nodes that are nearby, or neighbor access nodes, and compares the characteristics with one or more thresholds to determine a preferred donor access node. Any access node that meets the threshold requirements is added to a list of candidate donor access nodes. The candidate donor access node that best meets the thresholds may be selected as the preferred donor access node, and a connection request submitted to the preferred donor access node. Since the quality of the connection between the relay wireless device and a donor access node provides the backhaul for any wireless connection between the relay wireless device and end-user devices, the preferred donor access node is one that provides the highest and most reliable quality of service, based on meeting the thresholds, to the end-user wireless devices.

The characteristics of each neighbor access node may comprise reliability characteristics, resource characteristics, radio characteristics, or any other characteristic in addition to a signal strength or distance from the access node. For example, reliability characteristics can include a backhaul connection reliability based on a block error rate (BER) or packet error rate (PER) of the access node. Reliability characteristics may further include a retransmission rate for the access node or for devices connected to the access node, including the relay wireless device. Resource characteristics may include resource availability for the access node, as well as a noise rise of the relay wireless device. Such characteristics may be measured by the relay wireless device, by the access node, in an uplink or downlink signal, or any combination thereof. In addition to these characteristics, the relay wireless device may obtain one or more radio characteristics including a frequency band class deployed by the access node. The frequency band class can be associated with one or more passive components in the radio path of the access node. For instance, passive components such as combiners, diplexers, or other filters may be coupled to the antenna and/or the radio transceiver of the access node. These components can alter the transmission characteristics of the link between the access node and wireless devices attached thereto, for instance by introducing additional delays or insertion losses. Identification of such passive components and/or the frequency band class associated therewith can be a useful characteristic in determining which access node is a preferred donor.

In some embodiments, these characteristics of the neighbor access nodes and radio signals associated therewith may vary based on a time of day, and can therefore be periodically measured or retrieved and stored in a local database of the relay wireless device and averaged over a period of time. Consequently, the relay wireless device can refer to locally-stored characteristics when it determines a preferred donor access node, and can therefore account for changing conditions at each access node. Further, a decision to connect to a preferred donor access node may be based on a comparison of the loading and throughput information for each access node with a requirement of the relay wireless device and the end-user wireless devices connected thereto. These and additional operations are further described with respect to the embodiments depicted in FIGS. 1-6 below.

FIG. 1 depicts an exemplary system 100 for donor selection. System 100 comprises a communication network 101, gateway 102, controller node 104, access nodes 110 and 120, relay wireless device 130, and end-user wireless devices 140, 142, and 144. In this embodiment, relay wireless device 130 relays services from one of access nodes 110, 120, to end-user wireless devices 140, 142, 144. To achieve this, relay wireless device 130 may be communicatively coupled to a mini-macro base station/access node 131. Mini-macro access node 131 acts as a wireless access point for wireless devices 140, 142, 144. Access node 110 is illustrated as having coverage area 115, and access node 120 is illustrated as having coverage area 125. Relay wireless device 130 is located within both coverage areas 115 and 120. Cluster of wireless devices 140 is located within coverage area 115, and wireless devices 142 and 144 are located outside either coverage area 115, 125, but within coverage area 135 of mini-macro access node 131. As a consequence, cluster of wireless devices 140 may access network services using the combination of relay wireless device 130 and mini-macro access node 131, rather than overload access node 110, which may be serving numerous other devices that are not shown. Moreover, wireless devices 142 and 144 that are outside ranges 115, 125 may access network services by virtue of being connected to relay wireless device 130 via mini-macro access node 131.

In operation, relay wireless device 130 is enabled to determine a preferred donor access node from among candidate donor access nodes 110, 120 that are within range. This determination is based on a comparison of a plurality of characteristics of each candidate donor access node 110, 120 with a number of thresholds for reliable and efficient provision of services to end-user wireless devices 140, 142, 144 via relay wireless device 130. The plurality of characteristics includes but is not limited to reliability characteristics, resource characteristics, radio characteristics, for each wireless communication link 138, 139 associated respectively with access nodes 110, 120. For example, reliability characteristics can include a block error rate (BER) or packet error rate (PER) of access nodes 110, 120, as reported by the access node, or as measured by relay wireless device 130. For example, a retransmission rate may be obtained for relay wireless device 130, and the retransmission rate is indicative of the error rate associated with one of access nodes 110, 120.

Further, resource characteristics may include resource availability for access nodes 110, 120. The resource availability includes an available throughput or bandwidth that is based, for instance, on resource block usage. Resource characteristics can also include as a noise rise associated with one of wireless links 138, 139. For example, for every new wireless device added to a network, additional noise is added to the network. That is, each new wireless device causes a "noise rise". In theory, the "noise rise" is defined as the ratio of total received wideband power to the noise power. In some embodiments, the noise rise can be based on a signal-to-interference noise ratio (SINR) of relay wireless device 130 when connected to an access node 110, 120. A higher "noise rise" value implies that more wireless devices have attached to the network, and each wireless device has to transmit at a higher power to overcome the higher noise level. This means smaller path loss can be tolerated, and the cell radius is reduced. Since a higher noise rise means higher capacity and smaller footprint, a lower noise rise means smaller capacity and bigger footprint. In some embodiments, the noise rise of relay wireless device 130 may be higher if relay wireless device 130 is elevated or mounted on a pole. Although this improves radio visibility of connections 138, 139, it may increase the noise rise of the particular sector or access node and negatively affect performance of other wireless devices attached to the particular sector or access node. Thus, limited noise rise is a useful characteristic to evaluate a preferred donor access node.

In addition to these characteristics, relay wireless device 130 may obtain one or more radio characteristics of access nodes 110, 120, such as an identification of passive components deployed within each access node 110, 120. For example, passive radio components such as combiners, diplexers, or other filters may be coupled to the antennae and/or the radio transceivers of one or both of access nodes 110, 120. The type and number of passive components is based on the frequency band class deployed by the access node. For instance, an access node that deploys a 2.5 GHz frequency band may include filters for enabling a roll-off on the bandwidth, which induce a short (20 ns) delay, or a high group delay for wireless devices attaching to the access node. The filters also induce an insertion loss, particularly for access nodes that do not deploy a contiguous spectrum of frequency bands, thereby causing higher delays of around 200-1000 ns. Consequently, as an alternative to the relay wireless device 130 retrieving or storing information related to passive components of each access node 110, 120, relay wireless device 130 can infer the presence, number, and type of passive components simply based on the frequency band class of each access node 110, 120. The frequency band class can be associated with one or more passive components in the radio path of the access node. Alternatively, the candidate donor access nodes 110, 120 can transmit this information in a broadcast available to all wireless devices. Any combination of this information can be gathered by relay wireless device 130 and used to make a determination of the preferred donor access node.

These and other characteristics of access nodes 110, 120 may be measured by the relay wireless device, by the access node, in an uplink or downlink signal, or any combination thereof. For instance, errors and retransmissions of uplink packets can be measured at relay wireless device 130, while errors and retransmissions of downlink packets are measured at one or both of access nodes 110, 120, and transmitted to relay wireless device 130. In some embodiments, the characteristics of access nodes 110, 120, and communication links 138, 139 may vary based on a time of day, and can therefore be periodically measured or retrieved and stored in a local database of relay wireless device 130 over a period of time. In alternate embodiments, the time-varying trends and/or averages can be recorded on another database such as database 105 coupled to controller node 104, and retrieved by relay wireless device 130. In either case, relay wireless device 130 can refer to the stored characteristics when it determines a preferred donor access node, without having to repeatedly query access nodes 110, 120, or make repeated measurements.

Further, a decision to connect to a preferred donor access node may be based on a comparison of the characteristics for each access node 110, 120 (or signals 138, 139 thereof) with a requirement of relay wireless device 130 and the end-user wireless devices 140, 142, 144 connected thereto. The requirements may be used to set the thresholds that are compared against the characteristics. The requirements may include, for instance, a specified bandwidth for a time period, or a minimum SINR level at a time of day, an ability to provide carrier-aggregation services, or any other features that can increase the quality of service (QoS) or reliability of the connection with relay wireless device 130. In some embodiments, resource block utilization may be used to determine the load or throughput of each access node. In some embodiments, the preferred donor access node is one that can provide relay wireless device 130 with preferential treatment because it is functioning as a relay. Examples of preferential treatment can include, but are not limited to, increasing a scheduling weight for relay wireless device 130, setting one or more network parameters in order to give traffic associated with relay wireless device 130 better network performance than traffic associated with non-relaying devices, and so on. Network parameters may be configured to provide one or more of higher priority in scheduling resources, improved RF conditions, higher throughput, lower latency, etc. to relay wireless device 130 than are provided to other non-relaying wireless devices, such as end-user wireless devices that directly connect to access nodes 110, 120.

Further, any access node that meets the threshold requirements from among access nodes 110, 120 (and other access nodes that are not shown) is added to a list of candidate donor access nodes. The candidate donor access node that best meets the thresholds may be selected as the preferred donor access node, and a connection request submitted to the preferred donor access node. Since the quality of the connection between the relay wireless device and a donor access node provides the backhaul for any wireless connection between the relay wireless device and end-user devices, the preferred donor access node is one that provides the highest and most reliable quality of service, based on meeting the thresholds, to the end-user wireless devices. Relay wireless device 130 may attempt to connect to a preferred donor access node, such as access node 110, by requesting to send a buffer status report to access node 110. Access node 110 can grant this request in a conventional manner. Relay wireless device 130 may respond to the grant by sending a short buffer status report. This short buffer status report is associated with a logical channel group that indicates the buffer status report is communicating the status of wireless device 130 as a relay, and thus is not asking for additional resource allocations (like a 'conventional' buffer status report would indicate). In other words, access node 110 is configured such that when a wireless device responds with a buffer status report for the 'special' logical channel group, it means that the buffer status report is not actually reporting the status of a buffer. Rather, this buffer status report indicates that wireless device 130 is now functioning as a relay.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 130 to one or more of wireless devices 140, 142, 144. Likewise, RF signals received from wireless devices 140, 142, 144 are amplified and transmitted by relay wireless device 130 to a donor access node 110, 120. Alternatively or in addition, a layer 2 relay device performs a decode and forward (DF) function. RF signals received from donor access node 110 are demodulated and decoded, then encoded and modulated again before being transmitted by relay wireless device 130 to one or more of wireless devices 140, 142, 144. Likewise, RF signals received from one or more of wireless devices 140, 142, 144 are demodulated and decoded, then encoded and modulated again before being transmitted by relay wireless device 130 to donor access node 110. Alternatively or in addition, a layer 3 relay device also performs a decode and forward function. However, a layer 3 relay device also performs additional processing (such as ciphering and/or data concatenation/segmentation/resassembly) In other words, relay wireless device 130 performs demodulation and decoding of the received RF signals (either uplink or downlink), processes received data, then encodes, modulates, and transmits the data to one or more of wireless devices 140, 142, 144.

Wireless devices 130, 140, 142, 144 may be any device, system, combination of devices, or other such communication platform capable of communicating wirelessly with access nodes 110, 120 using one or more frequency bands deployed by access nodes 110, 120. Wireless devices 130, 140, 142, 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 can be any network node configured to provide communication between wireless devices 130, 140, 142, 144, and communication network 101. Access nodes 110, 120 can be standard access nodes and/or short range, low power, small access nodes. A standard access node can be a macrocell access node such as a base transceiver station, a radio base station, an eNodeB device, or an enhanced eNodeB device, or the like. In an exemplary embodiment, a macrocell access node can have a coverage area 115, 125 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise a processor and associated circuitry to execute or direct the execution of computer-readable instructions to obtain information. Access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 120 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
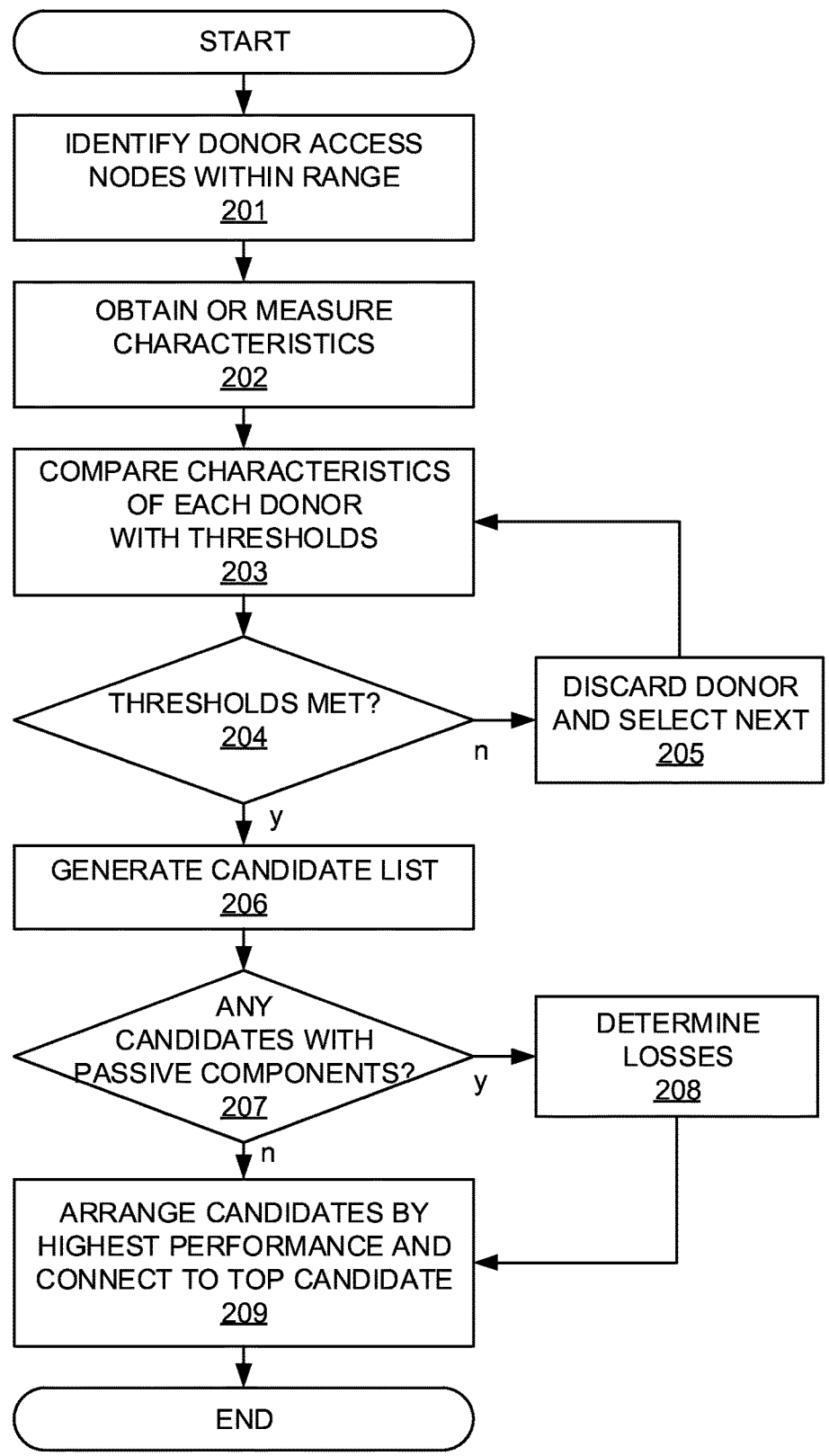
FIG. 2 depicts an exemplary method for donor selection.

FIG. 2 depicts an exemplary method for donor selection. The method is generally discussed with reference to elements within system 100. For example, the method comprises operations that may be performed by relay wireless device 130. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 201, a relay wireless device identifies donor access nodes within which it is in range. Any access node may be a potential candidate donor access node, at least until it is discarded for not being able to meet sufficient threshold criteria. For instance, a relay wireless device may be mounted on a structure or a pole, thereby increasing its visibility to numerous access nodes. Thus, although the pool of potential candidate donor access nodes is large, the subsequent operations of determining preferred donor access nodes are necessary to narrow the pool.

At 202, the wireless device obtains or measures a plurality of characteristics of each available donor access node. The plurality of characteristics includes but is not limited to reliability characteristics, resource characteristics, and radio characteristics. For example, reliability characteristics can include a block error rate (BER) or packet error rate (PER), or a retransmission rate for uplink or downlink packets transmitted between the access node and wireless devices attached thereto. Retransmission rate includes a packet drop rate for both downlink and uplink channels.

Resource characteristics may include resource availability for the access nodes such as an available throughput or bandwidth. Resource characteristics can include buffer information for the access node, including a loading margin for support of small cells such as the relay wireless device. Resource characteristics can also include as a noise rise associated with new wireless devices attached to the access node. The noise rise can be based on a signal-to-interference noise ratio (SINR) of the relay wireless device when connected to an access node. The noise rise includes a noise rise caused by insertion of the relay wireless device into the network, i.e. noise rise caused to other network elements caused by insertion of the relay wireless device, as well as the potential noise rise caused to the relay wireless device by other wireless devices that subsequently attach to the access node. This information can be recorded by the access node and shared with the relay wireless device upon request, or broadcast.

Further, radio characteristics of each access node include information related to passive components deployed within each access node that can add inherent insertion losses. The passive component information can be stored on a table locally at the relay wireless device or accessible via the network, for instance in a broadcast from an access node. Since the type and number of passive components is based on the frequency band class deployed by the access node, the relay wireless device can infer the presence, number, and type of passive components based on the frequency band class deployed by each access node. All these characteristics can be stored over a time period and patterns determined thereof, as well as measured or obtained at specific times during said time period, such as during a maintenance period of the access node, or over a 24-hour period.

In 203, the characteristics are compared with a plurality of thresholds. The plurality of thresholds may include reliability threshold criteria, resource threshold criteria, and radio threshold criteria, to correspond with the reliability, resource, and radio characteristics of each access node. In 204, a decision about whether or not the characteristics of each access node meet the thresholds includes evaluating both high and low thresholds. For instance, a block error rate (BER) threshold is a low threshold whereby any access node that has a BER lower than the threshold is considered a candidate for a preferred donor node in 206. On the other hand, a throughput threshold is a high threshold, whereby any access node that offers a throughput higher than the threshold is considered a candidate in 206. Other threshold comparisons can be based on requirements such as a specified bandwidth for a time period, or a minimum SINR level at a time of day, an ability to provide carrier-aggregation services, or any other features that can increase the quality of service (QoS) or reliability of the connection with the relay wireless device. In some embodiments, resource block utilization may be used to determine the load. In some embodiments, preferred candidate donor access nodes are those that can provide the relay access node with preferential treatment because it is functioning as a relay. Meanwhile, in 205, access nodes that do not meet the thresholds are discarded from consideration, and threshold comparison 203-204 is repeated until there are no more characteristics to compare. At 206, the candidate donor access node list is generated, wherein all access nodes in the candidate donor access node list satisfy the threshold criteria to at least a minimum level.

In addition to the threshold criteria comparison, passive components of each candidate donor access node and losses thereof are determined in 207-208. This information is also used to rank the candidate donor access nodes in 209. For instance, passive components can introduce additional delays and insertion losses due to increased group radiation. Such information may be stored locally, broadcast by the network, or inferred based on a frequency band class deployed by the access node, as further described herein and with reference to FIG. 5. Candidates are arranged in 209 based on how well they satisfy the thresholds in 204, as well as how large the losses caused by passive components can be in 208. In some embodiments, steps 207-208 are incorporated within threshold comparison 203-205, such that access nodes with a threshold number of passive components or insertion losses, or a specific class of frequency band, are automatically discarded before generation 206 of the candidate list.

In some embodiments, the candidates may be arranged in 209 based primarily on one characteristic, and refined using a secondary characteristic. For instance, the relay wireless device may prioritize the available throughput at a specific time, and may refine the selection using a secondary characteristic such as noise rise or insertion loss. The candidate donor access node that best meets the thresholds may be selected as the preferred donor access node, and a connection request submitted to the preferred donor access node. The relay wireless device may attempt to connect to the preferred donor access node by indicating its relay status to the access node, for instance by requesting to send a buffer status report to the access node, or by any other means evident to those having ordinary skill in the art in light of this disclosure.

Figure 3:
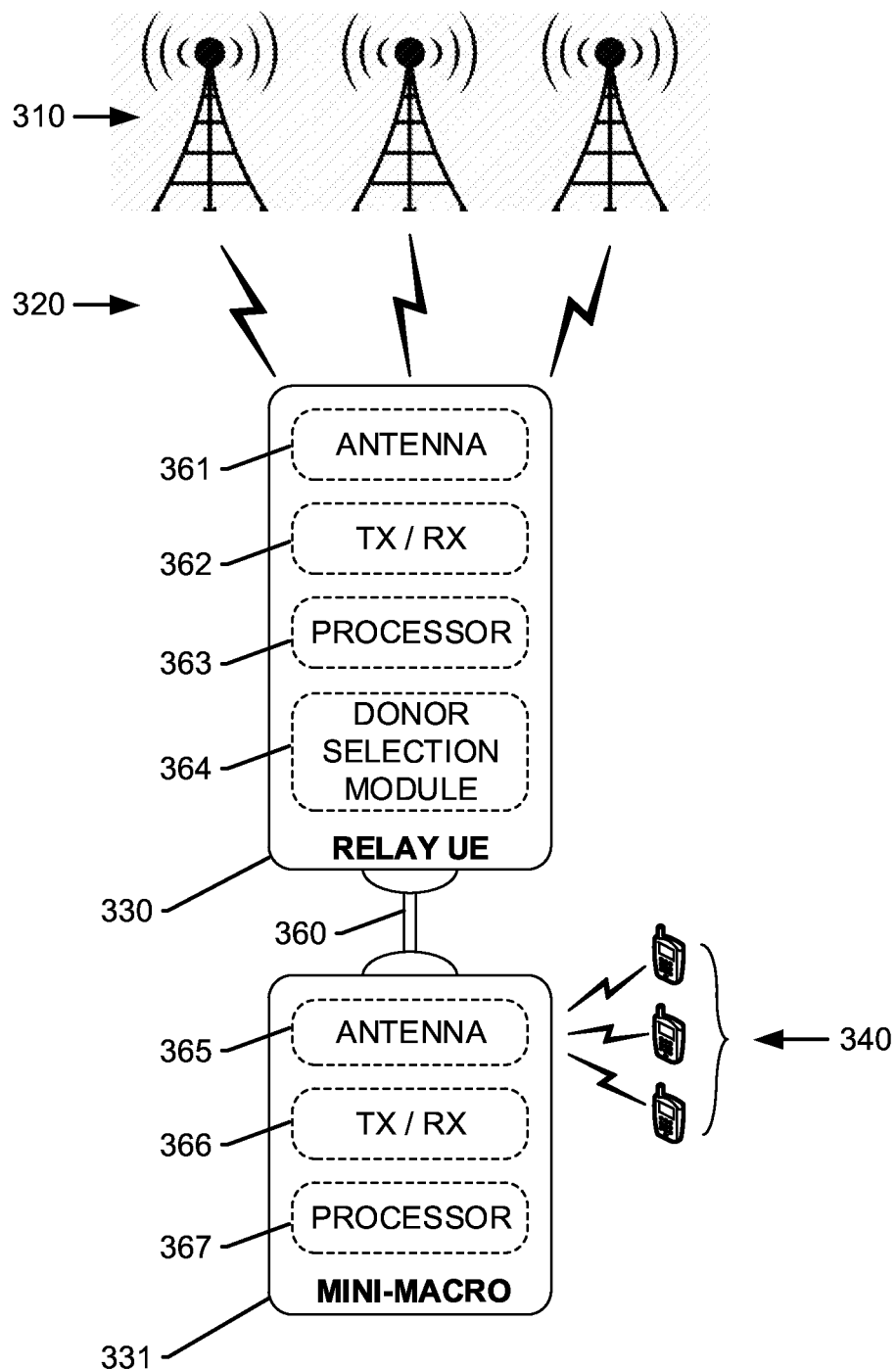
FIG. 3 depicts an exemplary relay wireless device coupled to a mini-macro access node.

FIG. 3 depicts an exemplary relay wireless device 330 coupled to a mini-macro access node 331. Relay wireless device 330 is illustrated as comprising an antenna 361 for direct (i.e. unrelayed) communication with one or more of access nodes 310 via communication links 320, a transceiver 362, a processor 363, and a donor selection module 364 for enabling relay wireless device 330 to perform donor selection operations described herein, for example with reference to FIG. 2. Further, relay wireless device 330 is coupled to mini-macro base station or access point 331 via a communication interface 360. Communication interface 360 may be any interface that enables direct communication between relay wireless device 330 and mini-macro 331, such as USB, FireWire, or any other serial, parallel, analog, or digital interface. Mini-macro access node 331 is illustrated as comprising an antenna 365 for wireless communication with end wireless devices 340, a transceiver 366, and a processor 367. Although only one transceiver is depicted in each of relay wireless device 330 and mini-macro access node 331, additional transceivers may be incorporated in order to facilitate communication across interface 360 and other network elements.

Figure 4:
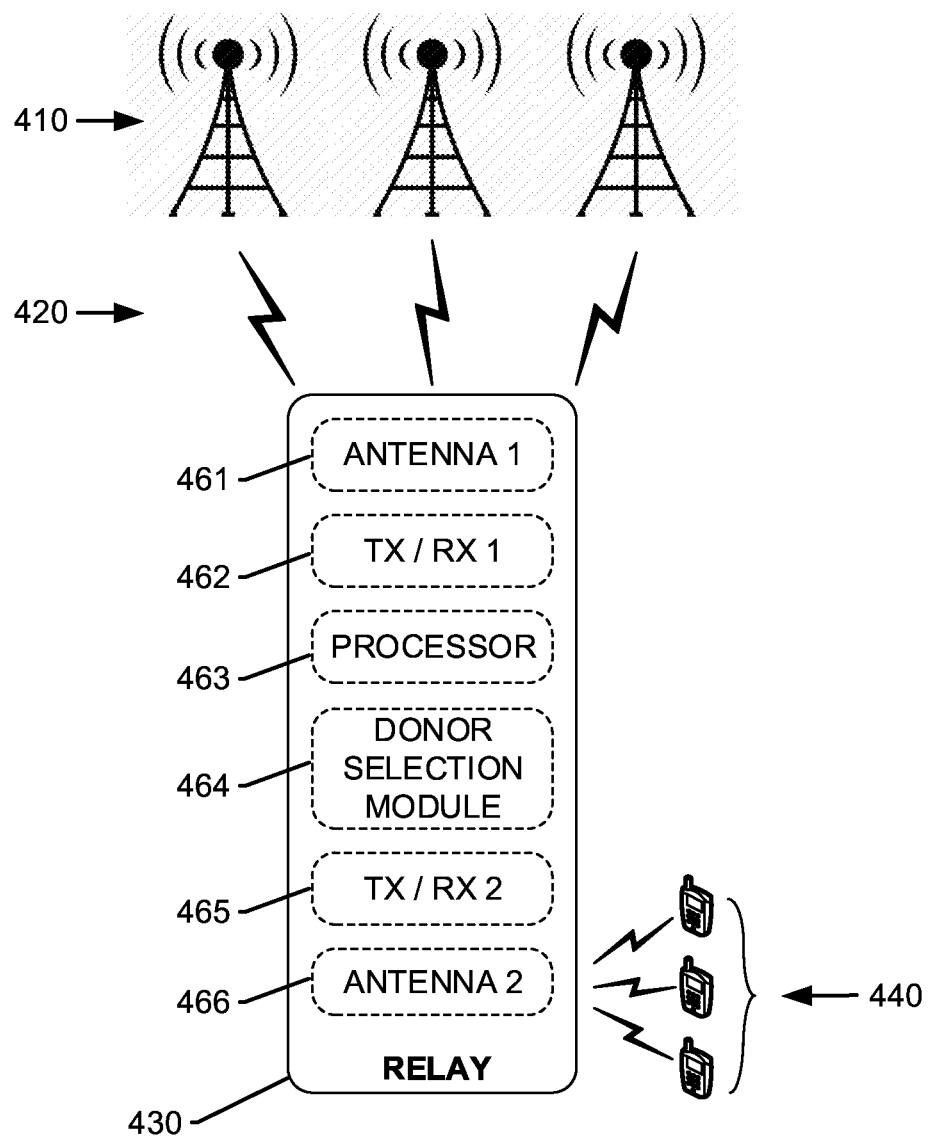
FIG. 4 depicts an exemplary relay access node combining a relay wireless device and a mini-macro access node.

FIG. 4 depicts an exemplary relay access node 430. Relay access node is a combination of the relay wireless device 330 and mini-macro 331 depicted in FIG. 3. However, the separate-but-connected combination of relay wireless device 330 and mini-macro 331 may also be referred to as a relay access node. In this case, relay access node 430 is illustrated as comprising a first antenna 461 for direct communication with one or more of access nodes 410 via communication links 420, a first transceiver 462, a processor 463, a donor selection module 464 for enabling relay access node 430 to perform donor selection operations described herein (for example with reference to FIG. 2), a second transceiver 465, and a second antenna 466 for wireless communication with end wireless devices 440. Although only two transceivers are depicted in relay access node 430, additional transceivers may be incorporated in order to facilitate communication with other network elements.

Figure 5:
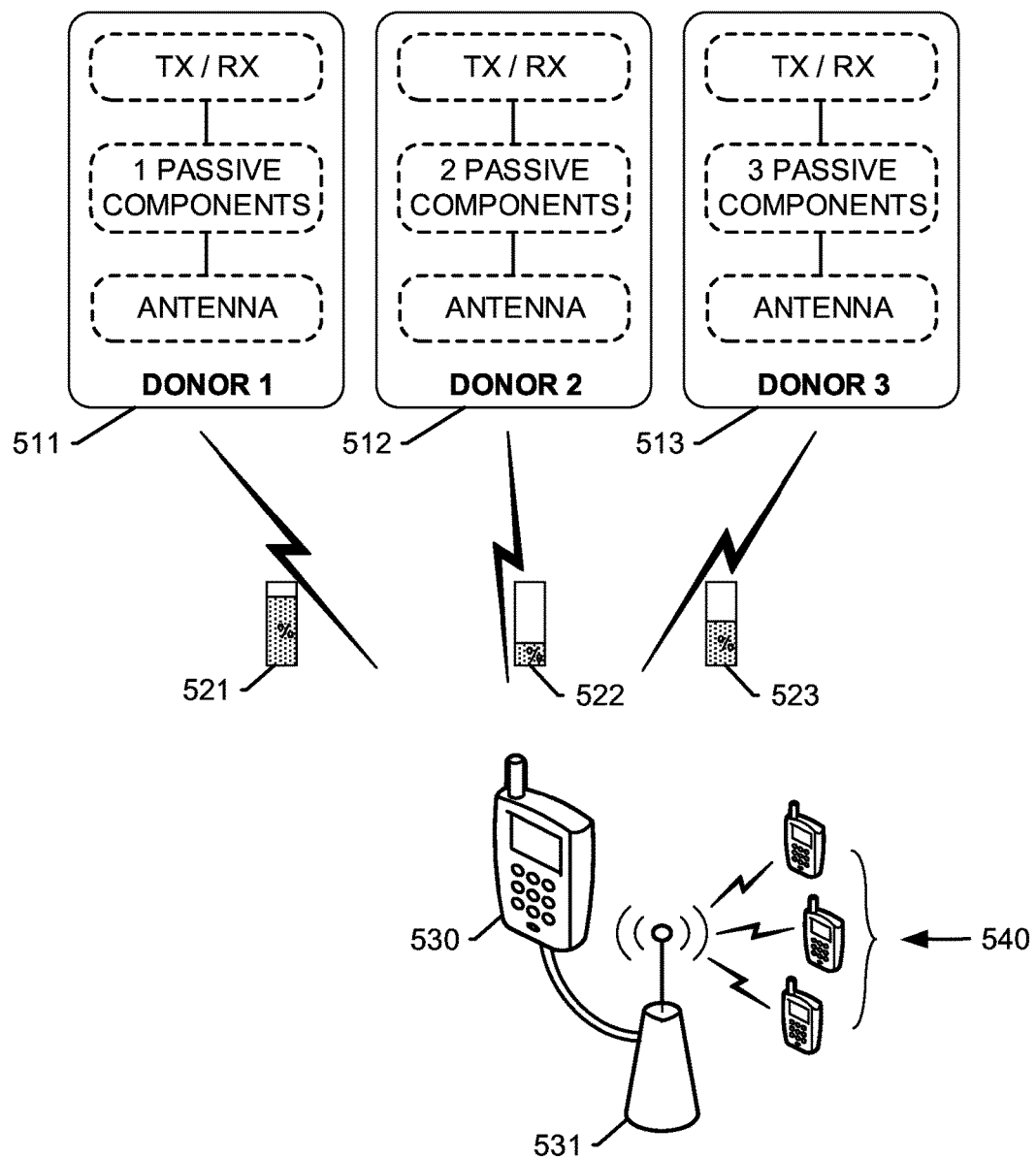
FIG. 5 depicts an exemplary relay wireless device for selecting donors based on passive components.

FIG. 5 depicts an exemplary relay wireless device for selecting donors based on passive components. As described herein, a relay wireless device 530 may obtain one or more radio characteristics including information related to passive components deployed within each access node 511, 512, 513, which can add inherent insertion losses. For instance, passive components such as combiners, diplexers, or other filters may be coupled to the antenna and/or the radio transceiver of each access node 511, 512, 513. These components can alter the transmission characteristics of corresponding communication links 521, 522, 523 between access nodes 511, 512, 513 and relay wireless device 530 attached thereto, for instance by introducing additional delays such as group delays, or insertion losses. As an example, filters used in a 2.5 GHz frequency band cause group delays and group delay radiation, while combiners used in high-capacity access nodes having multiple radios shared with one antenna of the same frequency band can increase an insertion loss. Since the type and number of passive components is based on the frequency band class deployed by the access node, relay wireless device 530 can infer the presence, number, and type of passive components based on the frequency band of links 521, 522, 523 deployed by each access node 511, 512, 513 respectively. The passive component information can be stored on a table locally at relay wireless device 530, or accessible via the network, for instance in a broadcast from one or more of access nodes 511, 512, 513.

Identification of such passive components and/or the frequency band class associated therewith can be a useful characteristic in determining which access node is a preferred donor. For instance, access node 512 includes two passive components, while access node 513 includes 3 passive components. However, relay wireless device 530 may determine that losses or group delay of communication link 522 are higher than that of communication link 523. Consequently, relay wireless device 530 determines that between access nodes 512 and 513, access node 513 is a better choice for a donor. In other embodiments, a group delay characteristic can be weighted or prioritized higher than a group delay radiation characteristic. The weight or priority of a characteristic is used in a final determination of a preferred donor access node from among a plurality of candidate donor access nodes, as described herein. Similarly, one or both of a group delay and a group delay radiation can be weighted higher than an insertion loss. These priorities and subsequent determinations may vary depending on the frequency band class deployed by access nodes 511, 512, 513, as well as the mode of communication links 521, 522, 523, such as a MIMO mode, or a border between different wireless networks and the internal components used therein to mitigate interference.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, wireless devices 130, 330, and/or network 101.

Figure 6:
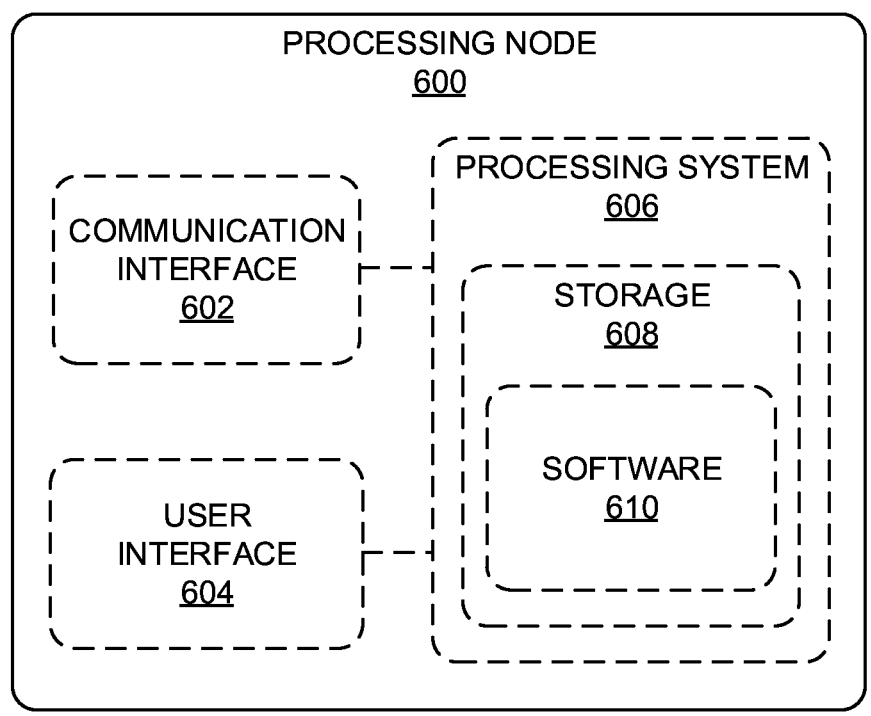
FIG. 6 depicts an exemplary processing node.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a call admission control module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for donor selection in a relay access node, the method comprising:
    identifying, by a processor coupled to the relay access node, a plurality of candidate donor access nodes, wherein the relay access node is within a radio range of each of the plurality of candidate donor access nodes;
    obtaining, by the processor, a plurality of characteristics associated with each of the plurality of candidate donor access nodes, the plurality of characteristics comprising at least a retransmission rate for uplink packets transmitted to each of the plurality of candidate donor access nodes from wireless devices attached thereto;
    based on a comparison of the plurality of characteristics between each of the plurality of candidate donor access nodes, determining, by the processor, a preferred donor access node; and
    requesting, by the processor, a connection to the preferred donor access node.

2. The method of claim 1, wherein the plurality of characteristics further comprises one or more of a block error rate, or a packet error rate.

3. The method of claim 1, wherein the retransmission rate is based on an uplink buffer.

4. The method of claim 1, wherein the plurality of characteristics further comprises one or more of an available throughput or a noise rise.

5. The method of claim 4, wherein the noise rise comprises a signal-to-interference noise ratio (SINR) of the relay access node when connected to one of each said plurality of candidate donor access nodes.

6. The method of claim 1, wherein the plurality of characteristics further comprises an identification of a frequency band class of one or more of each of the plurality of candidate donor access nodes.

7. The method of claim 6, wherein the identification of the frequency band class is associated with one or more passive components of said one or more of each of the plurality of candidate donor access nodes.

8. The method of claim 7, wherein said one or more passive components comprises any combination of a combiner, a diplexer, or a roll-off filter.

9. The method of claim 8, wherein the radio characteristic further comprises an insertion loss.

10. A system for donor selection, the system comprising:
    a relay access node configured to relay wireless services from a donor access node to one or more wireless devices; and
    a processor communicatively coupled to the relay access node, the processor for configuring the relay access node to execute operations comprising:
        determining one or more candidate donor access nodes out of a plurality of donor access nodes, the one or more candidate donor access nodes meeting one or more threshold criteria; and
        requesting a connection to a preferred donor access node out of the one or more candidate donor access nodes that most exceeds the one or more threshold criteria;
        wherein the one or more threshold criteria comprise at least a threshold retransmission rate for uplink packets transmitted to each of the plurality of candidate donor access nodes from wireless devices attached thereto.

11. The system of claim 10, wherein the operations further comprise determining the preferred donor access node based on a comparison of the one or more threshold criteria with a plurality of characteristics of each of the one or more candidate donor access nodes, the plurality of characteristics comprising at least a measured retransmission rate for the uplink packets.

12. The system of claim 11, wherein the preferred donor access node that most exceeds the one or more threshold criteria has a highest average characteristic from the plurality of characteristics.

13. The system of claim 11, wherein the preferred donor access node that most exceeds the one or more threshold criteria meets a higher number of said one or more threshold criteria than any other candidate donor access node.

14. The system of claim 10, wherein the relay access node is within a radio range of each of the plurality of candidate donor access nodes.

15. A relay node for donor selection, the relay node comprising a processor for enabling the relay node to perform operations comprising:
    obtaining, by the processor of the relay node, a plurality of characteristics associated with each of a plurality of candidate donor access nodes, wherein the relay node is within a radio range of each of the plurality of candidate donor access nodes, and wherein the plurality of characteristics comprises at least a retransmission rate for uplink packets transmitted to each of the plurality of candidate donor access nodes from wireless devices attached thereto;
    based on a comparison of each the plurality of characteristics with a corresponding plurality of threshold criteria, determining, by the processor, a preferred donor access node, wherein the plurality of threshold criteria comprises at least a threshold retransmission rate; and
    requesting, by the processor, a connection to the preferred donor access node.

16. The relay node of claim 15, wherein obtaining the plurality of characteristics further comprises measuring one or more of said plurality of characteristics.

17. The relay node of claim 15, wherein obtaining the plurality of characteristics further comprises receiving one or more of said plurality of characteristics in a broadcast from one or more of said each of the plurality of candidate donor access nodes.

18. The relay node of claim 15, further comprising obtaining the plurality of characteristics at a fixed time.

19. The method of claim 18, further comprising obtaining the plurality of characteristics at the fixed time over a period of days, and determining an average.

20. The method of claim 19, wherein the fixed time comprises a time period.

* * * * *